United States Patent
Oda (10) Patent No.: US 7,350,103 B2
(45) Date of Patent: Mar. 25, 2008

(54) ACCESS LOG STORAGE SYSTEM AND DIGITAL MULTI-FUNCTION APPARATUS

(75) Inventor: Akihiko Oda, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 587 days.

(21) Appl. No.: 10/942,249

(22) Filed: Sep. 15, 2004

(65) Prior Publication Data
US 2005/0210315 A1    Sep. 22, 2005

(30) Foreign Application Priority Data
Mar. 1, 2004    (JP) .............................. 2004-055920

(51) Int. Cl.
*G06F 11/00* (2006.01)
(52) U.S. Cl. .......................................... 714/6; 713/165
(58) Field of Classification Search ............... 714/6, 714/15, 20; 713/165
See application file for complete search history.

(56) References Cited

U.S. PATENT DOCUMENTS

| | | | |
|---|---|---|---|
| 5,617,532 A * | 4/1997 | Ushiyama ................... | 714/36 |
| 6,237,108 B1 * | 5/2001 | Ogawa et al. ................ | 714/6 |
| 6,243,829 B1 * | 6/2001 | Chan ............................. | 714/7 |
| 6,389,554 B1 * | 5/2002 | Jung et al. ..................... | 714/6 |
| 6,430,702 B1 * | 8/2002 | Santeler et al. ................ | 714/6 |
| 6,473,841 B1 * | 10/2002 | Ueda et al. ................. | 711/156 |

FOREIGN PATENT DOCUMENTS

JP    2002-140210 A    5/2002

* cited by examiner

*Primary Examiner*—Nadeem Iqbal
(74) *Attorney, Agent, or Firm*—Frishauf, Holtz, Goodman & Chick, P.C.

(57) ABSTRACT

Access log storing system (20) to save access history from outside the system as log data having a first memory (70) to save log data, a second memory (80) to also save log data and a storage control device (50) to switch the log data storage destination from memory (70) to second memory (80) in situations where log data cannot be saved I first memory (70).

6 Claims, 6 Drawing Sheets

ACCESS LOG STORAGE SYSTEM AND DIGITAL MULTI-FUNCTION APPARATUS

BACKGROUND

1. Field of the Invention

The present invention relates to a system which saves access logs, particularly relates to an access log storage system which saves access logs in a memory apparatus controlled by a file system.

2. Description of Related Art

In recent years, digital multi-function apparatus not only includes the functions as a copier but also other functions. Functions such as a document printing device having a hard disk drive capable to save document data to retrieve necessary data and to print them has become popular. The digital multi-function apparatus are capable of saving various kinds of electronic data since many functions are incorporated in a digital multi-function apparatus. However, the possibility that such saved data is stolen, falsified and/or destroyed by a malicious third party has increased. For this reason, a digital multi-function apparatus equipped with security functions to protect confidential documents and personal data has come popular.

Among these security features, there is a function to obtain access histories to protected data saved in the apparatus.

Specially, since the access history becomes almost always large volume of log data there is a log memory method which stores access history in a hard disk drive controlled by a file system. (For example, refer to Patent Reference No. 1).

Patent reference No. 1: Japanese Patent Open to Public, Tokkai 2002-140210.

Of course it is preferable that all access history to be protected should be memorized without any missing access event.

However, in many cases, to write data in a file is prohibited during initialization of the file system or initialization operation in many file systems commercially available. When an attack to the protected subject matter in a security system occurs during the initialization time period described above, the hard disk drive cannot receive commands from the log storage system. Accordingly, the fact that an attack has occurred is not memorized in the hard disk drive. For this reason, important log data of the security system cannot be saved and there is a possibility that the security system becomes frail.

SUMMARY

The object of the present invention is to solve these problems and provide a system capable to consistently store log data without any missing access history.

Embodiment 1

In accordance with one aspect of the present invention, there is provided access log storing system (20) to save access history from outside as log data comprising a first memory (70) to save log data, second memory (80) to save log data and storage control device (50) to switch a log data storage destination from first memory (70) to second memory (80) in the situation where first memory (70) can not save log data.

According to Embodiment 1 above, both first memory (70) and second memory (80) have a function to memorize log data, but first memory (70) normally saves log data. In situations where first memory (70) cannot save log data, storage control device (50) switches the log data storage destination to second memory (80), whereby it becomes possible to save log data without any missing log data based on this switching operation.

First memory (70) comprises, for example, HDD (Hard Disk Drive). As new access is continuously added, the volume of data becomes huge. First memory (70) has serves to save this huge amount of data. Memory apparatus other than HDD can also be used for the memory as long as it can save a huge volume of data.

Second memory (80) comprises for example a nonvolatile RAM (Random Access Memory) or a flash memory. Second memory (80) serves to save log data without any missing log data in situation where first memory (70) cannot save log data. Plural memory devices can be used as long as they compensate first memory (70) by storing log data.

The phrase that "in the situation where first memory (70) cannot save log data" means that first memory (70) is under the situation where file system (60) being controlled is in the incidents such as initial processing, general failure or de-flag processing.

Embodiment 2

In accordance with another aspect of the present invention, provided is access log storage system (20) in Embodiment 1, wherein storage control device (50) moves log data saved in second memory (80) to first memory (70) and switches the log data storage destination to first memory (70).

According to Embodiment 2 of the present invention, storage control device (50) is arranged so that when first memory (70) returns to the situation where first memory (70) can save log data again, storage control device (50) switches a log data storage destination to first memory (70). While first memory (70) is in the situation where first memory (70) cannot save log data, second memory (80) saves the log data and storage control device (50) moves log data saved in second memory (80) back to first memory (70), whereby first memory (70) thoroughly controls the log data. For example, process to transfer log data saved in second memory (80) to first memory (70) is conducted as soon as first memory (70) is recovered or when load of first memory (70) is light.

The capacity of second memory (80) can be less than that of first memory (70) since second memory (80) saves log data only in situations where first memory (70) cannot save it. Second memory (80) can prepare for the next situation where first memory (70) cannot save log data since log data saved in the second memory (80) is moved back to first memory (70).

Embodiment 3

In accordance with another aspect of the present invention, provided is access log storage system (20) in Embodiment 2, wherein log data saved in first memory (70) is arranged in a time series.

According to Embodiment 3, log data saved in first memory (70) is arranged in a time series. There are three kinds of data in first memory (70): which are 1) log data originally saved in first memory (70), 2) log data moved back from second memory (80), and 3) log data newly saved after recovery of first save memory (70). When a new access occurs while log data saved in second memory (80) is moved back to first memory (70), new log data is saved in first memory (70). In this instance, there is a possibility that the continuity of log data-cannot be maintained. In this situation, the three kinds of log data arranged in a time series make it easy to trace log data and are effective to enhance the security function.

Embodiment 4

In accordance with another aspect of the present invention, provided is access log storage system (20) in Embodiment 1, 2 or 3, wherein storage control device (50) switches the log data storage destination from first memory (70) to second memory (80) while file system (60) is in an initializing process.

According to Embodiment 4, there are situations where first memory (70) cannot save log data while file system (60) is in an initializing process, since file system (60) controls first memory (70). In this situation, storage control device (50) makes it possible to switch the log data destination to second memory (80) to save log data without any missing log data.

Embodiment 5

In accordance with still another aspect of the present invention, provided is a digital multi-function apparatus having access log storage system (20) in Embodiment 1, 2, 3 or 4.

According to Embodiment 5, it becomes possible to save access data to a digital multi-function apparatus connected to a network as log data. Much important document data is stored in a current digital multi-function apparatus. Accordingly, it is possible to quickly respond to attacks from the outside and to realize higher quality and enhanced security functions.

According to the present invention of an access log storage system, log data can be saved without any missing log data since a storage control device switches the log data storage destination to a second memory to save log data when the first memory cannot save the log data.

In addition, log data can be thoroughly controlled since log data saved in the second memory is moved back to the first memory.

Continuity of log data can be assured since log data saved in the first memory is arranged in a time series, whereby, it is easy to trace log data and to enhances security functions.

Specifically, since it is impossible to save log data to the first memory while the file system is undergoing an initializing process, log data can be saved to the second memory by switching the log data storage destination to the second memory. As a result, a assured security function can be realized.

Log data in a digital multi-function apparatus can be saved without any missing log data by having the access log storage system explained above. It also becomes possible to effectively secure confidential data in the multi-function apparatus.

DETAILED DESCRIPTION OF THE PREFERRED EMBODIMENTS

Embodiments of the present invention will be explained below by using drawings.

Figure 1:
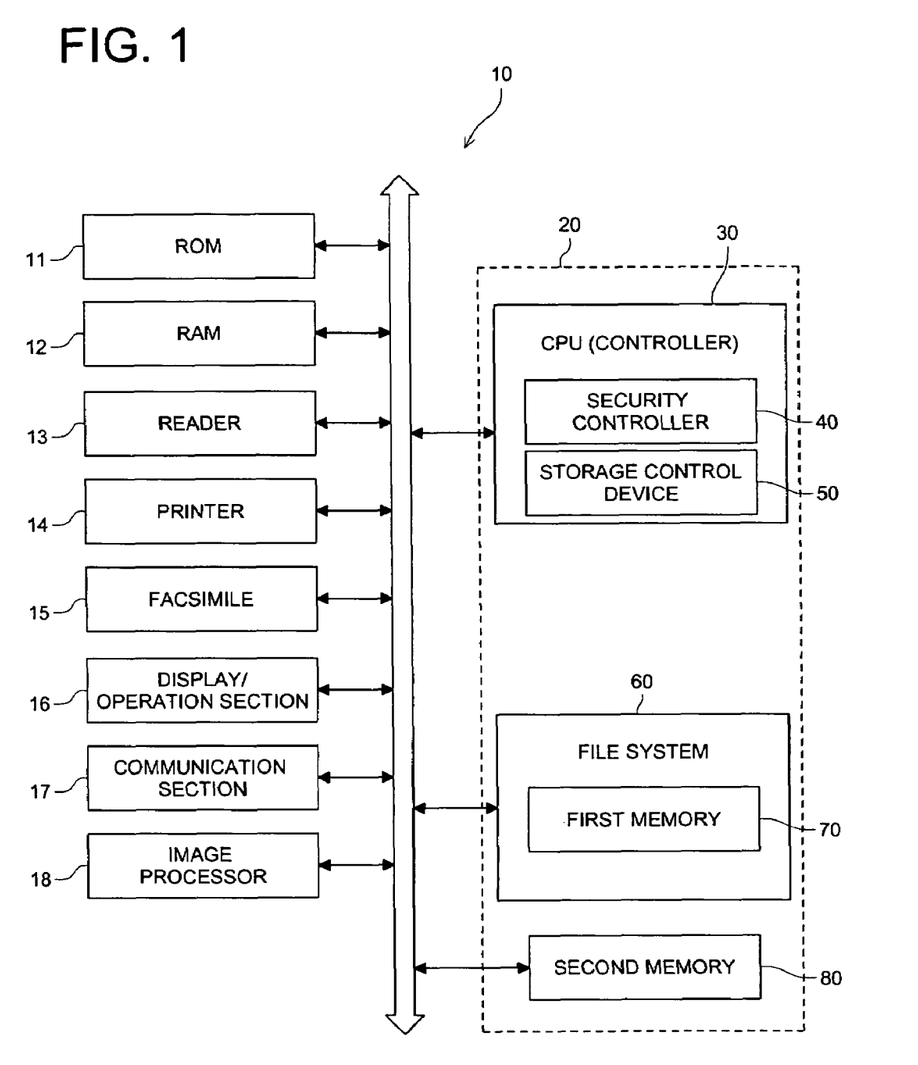
FIG. 1 is a block diagram showing the configuration of a digital multi-function apparatus having an access log storage system which relates to the embodiment of the present invention.

FIG. 1 shows the configuration of digital multi-function apparatus 10 having access log storage system 20 of the present invention. Digital multi-function apparatus 10 has a scanner function to scan manuscript images, a copy function to scan manuscript images and to form duplicated images onto a recording medium, a printer function to form images corresponding to print data onto a recording paper sheet, a facsimile function to send and to receive manuscript images, a transmitting function to transmit images and a storage function to save access history as log data, etc.

Digital multi-function apparatus 10 is connected to network such as LAN (local area network), etc. and also is connected to external network via LAN.

Digital multi-function apparatus 10 comprises the circuits of CPU (Central Processing Unit) 30 serving as a controller to totally control its operations, ROM (Read Only Memory) 11 and RAM (Random Access Memory) 12 as a major unit. ROM 11 memorizes programs to be executed by CPU 30 and various kinds of fixed data. RAM 12 functions as a working memory to temporally store various kinds of data when CPU 30 executes the programs, and as a page memory to store at least one page of image data to conduct a rotation process.

Reader 13 functions to read out manuscript images to take in image data corresponding to the manuscript images. Reader 13 comprises a light source to expose a manuscript, a line image sensor to read out one line of the manuscript in the width direction of the manuscript, a conveyance device to convey the manuscript line by line in the longitudinal direction of the manuscript, and optical paths comprising lenses and mirrors to direct reflected light from the manuscript to a line image sensor to form images. The line image sensor comprises CCD (Charge Coupled Device). Analog image signals outputted from the line image sensor are converted into digital signals and are taken in as digital image data.

Printer 14 functions to form images corresponding to image data onto a recording paper sheet by an electronic photographic process and to output them. Printer 14 comprises a conveyance apparatus to convey the recording paper sheet, a photosensitive drum, an electrostatic charger, a laser unit, an exposure apparatus, a cleaning apparatus and a fixing apparatus, and functions as a so called laser beam printer. Facsimile 15 functions as a facsimile. Facsimile 15 also functions to compress/extend image data according to a standard compression/extension method used in a conventional facsimile device and to control various kinds of communication procedure to conduct a facsimile sending/receiving function.

Display/Operation section 16 comprises a liquid crystal display having a touch panel thereon, and operation switches to display various kinds of instructions and status information for the operator and to allow the operator to input commands via the operation switches. Communication controller 17 functions to communicate with telephone lines and various kinds of networks.

Image processor 18 functions to compress/extend, to magnify/reduce image data and to rotate images.

First memory 70 is a large volume storage apparatus to store log data, and is controlled by file system 60. First memory 70 stores important document data and image data, in for example, a hard disk drive (HDD), etc.

Second memory 80 is a storage apparatus to save log data as a backup of first memory 70 in situations where first memory 70 cannot save the log data. Second memory 80 comprises, for example, a nonvolatile RAM or a flash memory, etc. Second memory 80 may be any storage apparatus as long as it compensates first memory 70. Further plural memories are acceptable as second memory 80.

Access log storage system 20 comprises CPU 30, first memory 70 and second memory 80. CPU 30 has two functions, which are security controller 40 and storage control device 50. Security controller 40 functions to request storage control device 50 to save log data when access to digital multi-function apparatus 10 occurs via a network.

Storage control device 50 functions to switch the log data storage destination to either first memory 70 or second memory 80. And Storage control device 50 also functions to write log data in a log data storage destination based on a request signal from security controller 40, and to arrange and move the log data saved in second memory 80 back to first memory 70.

There is a high possibility of outside attacks since digital multi-function apparatus 10 is connected to a network. Further digital multi-function apparatus 10 has an image data storage function therein and stores the data of important and confidential documents and images therein. Accordingly, it becomes possible to trace stored log data to quickly respond to outside by having access log storage system 20 in digital multi-function apparatus 10. Enhanced security functions in digital multi-function apparatus 10 can thereby be achieved.

Figure 2:
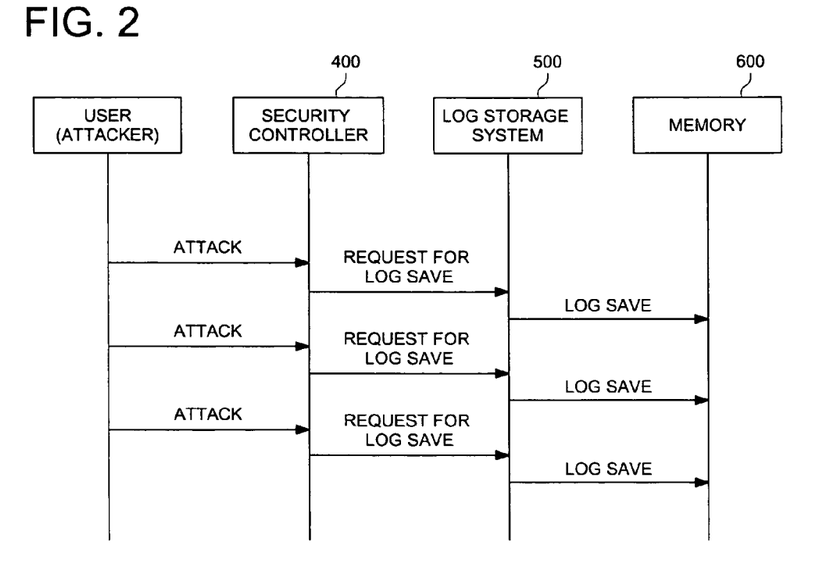
FIG. 2 is a chart for the operation of a log data storage in a conventional log data storage system.

FIG. 2 shows the operation of log data storage in a conventional log data storage system. When an access (attack) occurs, security controller 400 requests log storage system 500, which is monitoring accesses to save logs. Log storage system 500, which received the request signal stores log data in memory 600, which is the only memory in the log storage system. This operation repeats and memory 600 saves log data. As explained above, log data is accordingly saved as long as memory 600 operates correctly, whereby the security of the log storage system is assured.

Figure 3:
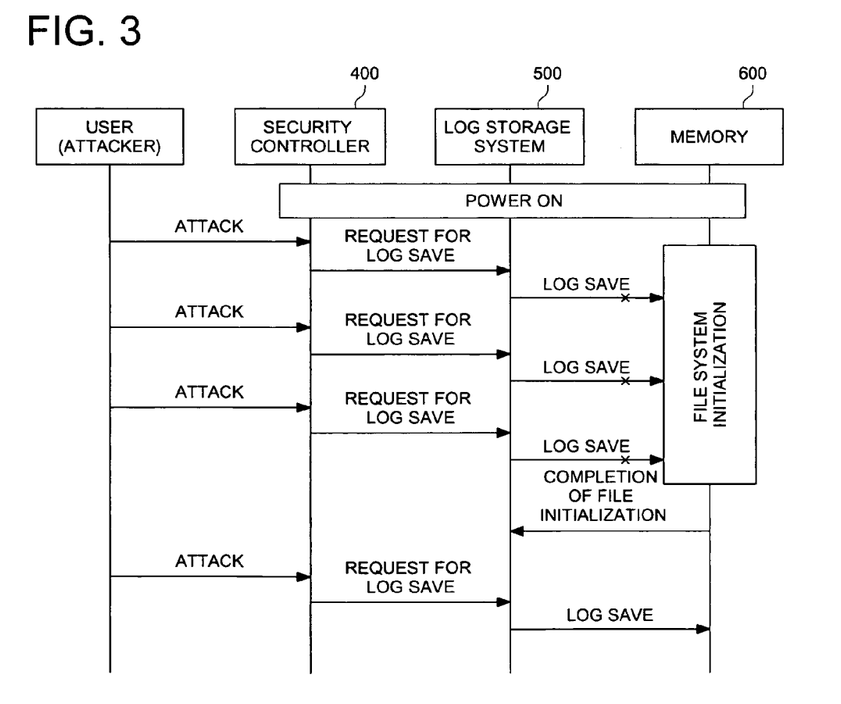
FIG. 3 is an other chart in an operation example when the memory shown in FIG. 2 is controlled by a file system.

FIG. 3 shows an operation example in which a file system controls memory 600 shown in FIG. 2. Normally, an initialization process is conducted right immediately after power is switched on. When memory 600 comprises a HDD (Hard Disk Drive) and a large amount of data is stored in the HDD, it takes a long time to complete the initialization process, and there are cases in which it takes several minutes to complete the initialization process.

While initializing, when an attack from the outside occurs, log storage system 500 cannot store the log of the attack in memory 600. Accordingly, log data could not be saved until the initializing process is completed and this creates a security drawback.

Figure 4:
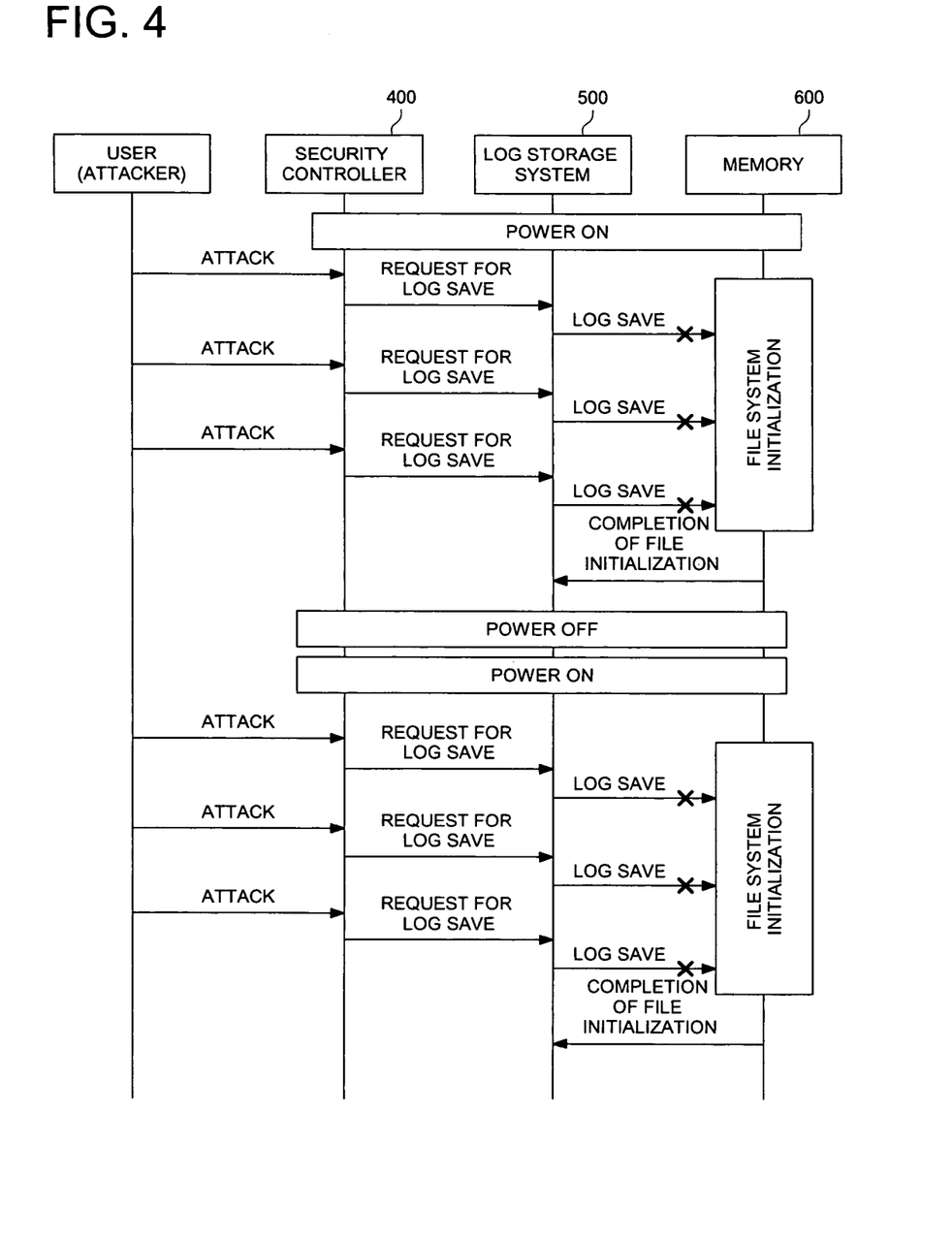
FIG. 4 is also a chart in an operation example when a security drawback in the system shown in FIG. 3 is attacked.

FIG. 4 shows an operation example in which the security drawback in the system shown in FIG. 3 is altered. The initialization process is executed when power is turned on. When the power on/off cycle repeats, the security drawback shown in FIG. 3 expands. There are cases in which an attack occurred without any log data remaining. When an attack occurs during this time period, it was impossible to take quick action against the attack and the log data storage system became ineffective since it is incapable to trace log data.

Figure 5:
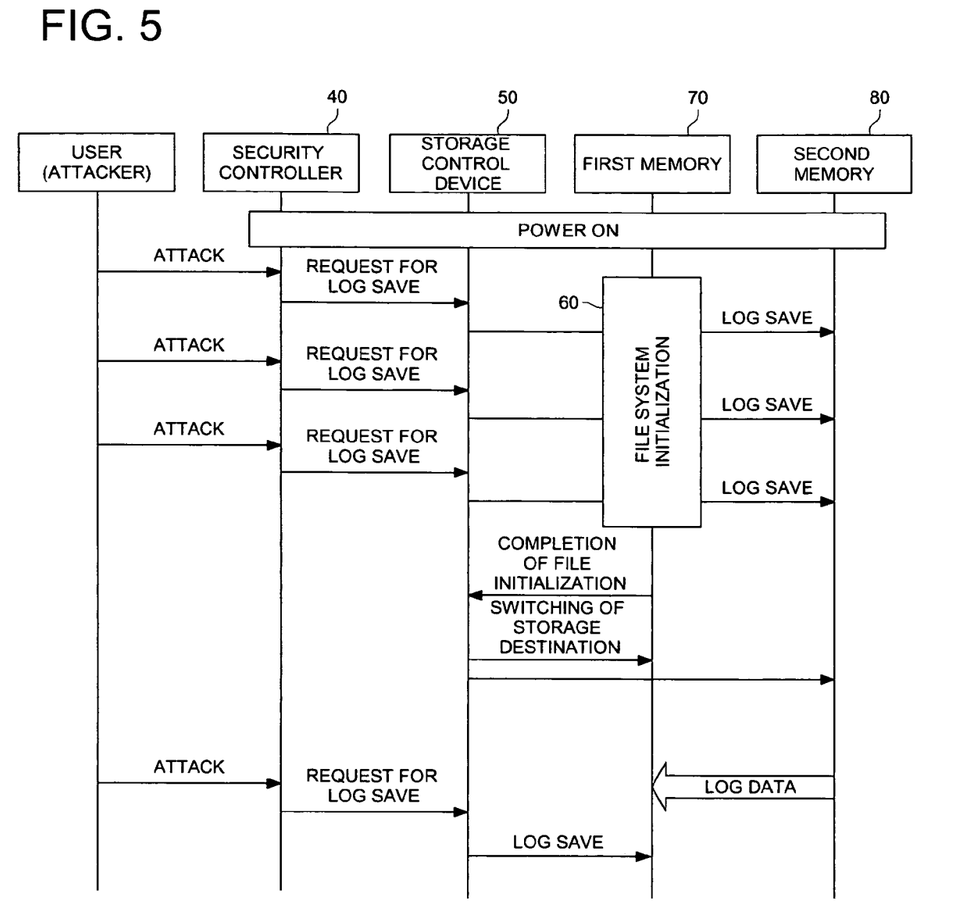
FIG. 5 is a chart showing the operation of storing log data in an access log storage system related to the embodiment of the present invention.

FIG. 5 shows a log data storage operation example in access log storage system 20 of the present invention. When an attack occurs during the initialization process of file system 60, security controller 40 monitoring attacks requests storage control device 50 to save logs. Storage control device 50 which received the request cannot save log data in first memory 70. Then storage control device 50 switches a log data storage destination so that second memory 80 saves the log data. Accordingly, second memory 80 saves the log data, and it becomes possible to establish a log data storage process without any missing log data.

And when the initialization process is completed, storage control device 50 switches the log data storage destination from second memory 80 to first memory 70. Accordingly, after that first memory 70 saves log data. Further, log data saved in second memory 80 is moved back to first memory 70. Storage control device 50 determines timing when log data saved in second memory 80 should be moved to first memory 70. The timing can be set right after the completion of initialization process, or can be determined based on the loading condition of first memory 70.

Storage control device 50 arranges saved log data in a time series when the log data is moved from second memory 80 to first memory 70 so that continuity of log data is maintained. Accordingly, it becomes possible to totally control the log data. Further, a security drawback shown in FIGS. 3 and 4 can be prevented and it becomes possible to realize a reliable security function.

Figure 6:
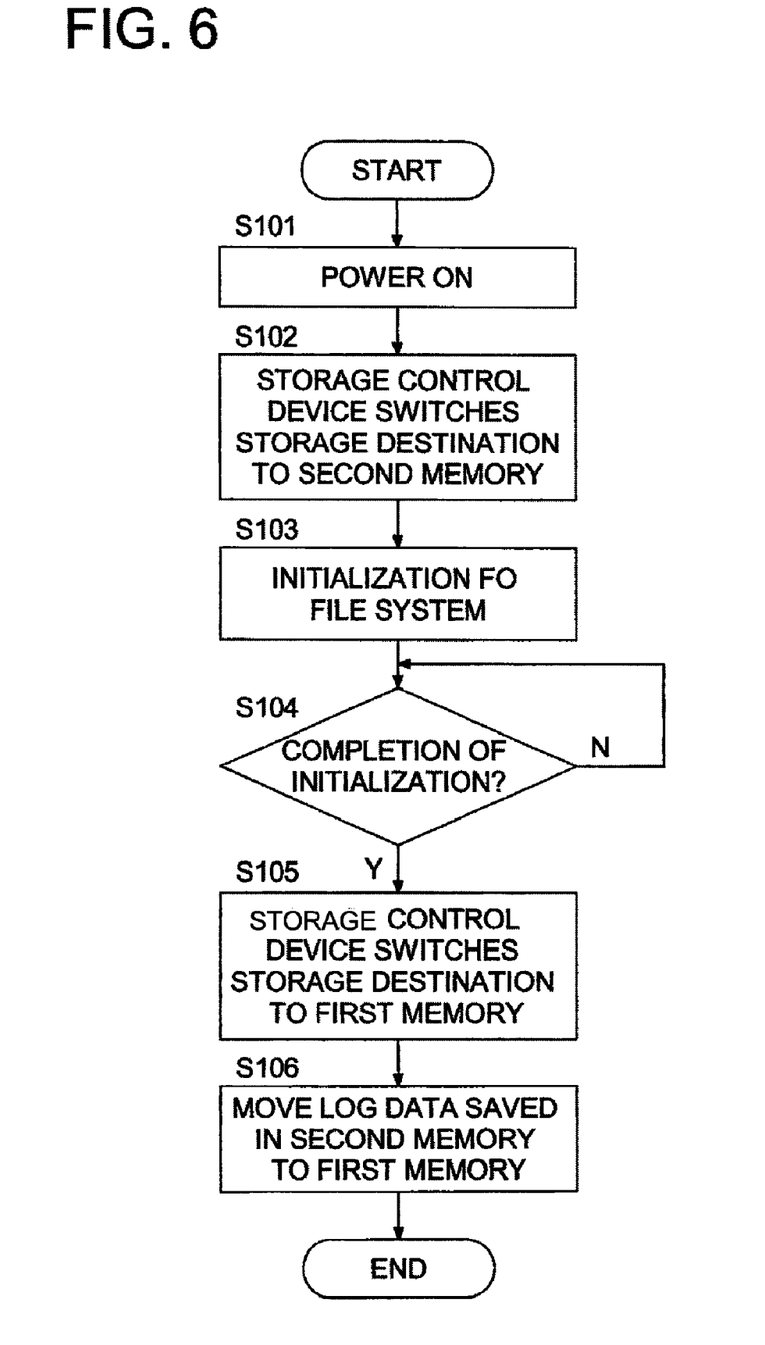
FIG. 6 is a flow chart to realize the operation shown in FIG. 5.

FIG. 6 shows a flow chart to realize the operations shown in FIG. 5. When power is on (S101), storage control device 50 switches the log data storage destination from first memory to second memory (S102). When access occurs during this time period, storage control device 50 saves log data in second memory 80. Next, the initialization process of file system 60, which controls first memory 70 is executed (S103). Storage control device 50 waits for the completion of the initialization process (S104; N); when finished (S104; Y) then changes the log data storage destination from second memory 80 to first memory 70 (S105). After this, log data saved in second memory 80 during the initialization process is moved back to first memory 70 (S106).

Finally, all log data is moved back to first memory 70 and thereby thoroughly controlled. Yet, storage control device 50 switches a log data storage destination by recognizing the timing of the completion of an initializing process based on inter-process communication between file system 60 and other sections in access log storage system 20.

Figure 7:
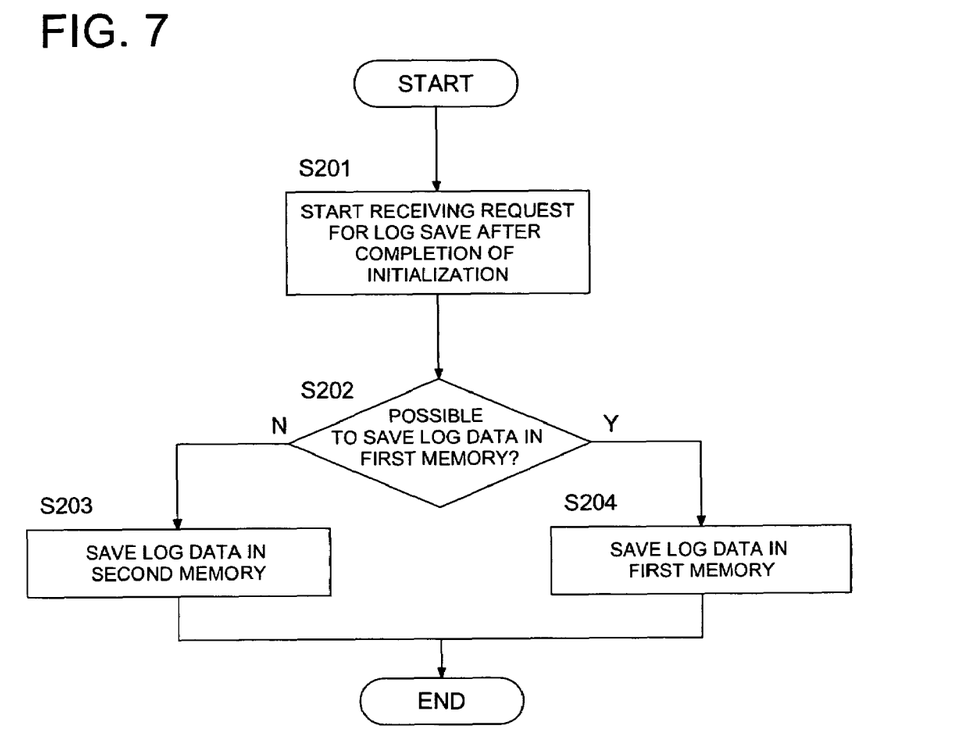
FIG. 7 is a flow chart to show the switching process to switch the log data storage destination when an access occurs after finishing the initializing process.

FIG. 7 shows the process flow to switch a log data storage destination when an access occurs after the completion of an initialization process. When the access occurs after the initialization process, security controller 40 requests storage control device 50 to save log data (S201). Storage control device 50 determines whether first memory 70 can save log data based on inter-process communication, etc. between file system 60 and other sections in access log storage system 20.

For example, "the situation where first memory 70 cannot save log data" means that a situations such as the occurrence of typical accidents or problems or a de-flagging process. When first memory can save log data (S201), storage control device 50 saves the log data in first memory 70; when first memory cannot save the log data (S202; N), then the log data is saved in second memory 80.

Further, process flow executes a switch of a log data storage destination when first memory is recovered is these same process flow executed after the completion of an initialization process.

Embodiments of the present invention are explained above. Specific configurations are not limited to the embodiments, a various changes and additions may be made therein without departing from the spirit and scope of the present invention. For example, a digital multi-function apparatus was explained in exemplary embodiments above, however, an access log storage system, which is the object of the present invention, is not limited to a digital multi-function apparatus.

It can also be an apparatus, which saves log data without any missing log data, in other words, it can be an apparatus serving to enhance security functions. For example, the access log storage system of the present invention can be included in a facsimile apparatus or various kinds of servers, which are subject to attack from outside. The access log storage system installed in an apparatus which frequently conducts energizing on/off operations.

What I claimed is:

1. An access log storage apparatus for storing an access history as log data comprising:
   a first memory to store log data;
   a second memory to store log data; and
   a storage control device to switch a log data storage destination to the second memory if the first memory cannot store log data;
   wherein a file system controls the first memory, and the storage control device switches the log data storage destination from the first memory to the second memory while the file system is in an initialization process.

2. The access log storage system of claim 1, wherein the storage control device writes log data stored in the second memory in the first memory and switches the log data storage destination to the first memory, after the first memory comes to a state in which the first memory can store log data.

3. The access log storage system of claim 2, wherein log data stored in the first memory is arranged in a time series.

4. A digital multi-function apparatus including the access log storage system of claim 1.

5. A digital multi-function apparatus including the access log storage system of claim 2.

6. A digital multi-function apparatus including the access log storage system of claim 3.

* * * * *